(12) United States Patent
Sakakibara (10) Patent No.: US 7,282,825 B2
(45) Date of Patent: Oct. 16, 2007

(54) STRUCTURE OF RECTIFIER FOR AUTOMOTIVE ALTERNATOR ENSURING RELIABLE ELECTRICAL CONNECTION

(75) Inventor: Hiroshi Sakakibara, Chita-gun (JP)

(73) Assignee: Denso Corporation, Kariya (JP)

( * ) Notice: Subject to any disclaimer, the term of this patent is extended or adjusted under 35 U.S.C. 154(b) by 125 days.

(21) Appl. No.: 11/319,061

(22) Filed: Dec. 28, 2005

(65) Prior Publication Data

US 2006/0138882 A1 Jun. 29, 2006

(30) Foreign Application Priority Data

Dec. 28, 2004 (JP) .............................. 2004-381760

(51) Int. Cl.
*H02K 11/00* (2006.01)
(52) U.S. Cl. ..................... 310/68 D; 310/71
(58) Field of Classification Search ............. 310/68 R, 310/68 D, 64, 71, 89; 363/141
See application file for complete search history.

(56) References Cited

U.S. PATENT DOCUMENTS

| | | | | |
|---|---|---|---|---|
| 5,659,212 | A * | 8/1997 | DePetris | 310/68 D |
| 6,107,711 | A * | 8/2000 | Borchert | 310/68 D |
| 6,252,320 | B1 * | 6/2001 | Ballard et al. | 310/68 D |
| 6,731,030 | B2 * | 5/2004 | Keidar et al. | 310/68 D |
| 6,936,941 | B2 * | 8/2005 | Oohashi et al. | 310/68 D |
| 2003/0042808 | A1 * | 3/2003 | Keidar et al. | 310/68 D |
| 2004/0239195 | A1 * | 12/2004 | Okamura et al. | 310/68 D |
| 2004/0256927 | A1 * | 12/2004 | Oohashi et al. | 310/68 D |

FOREIGN PATENT DOCUMENTS

| | | |
|---|---|---|
| JP | U 06-6728 | 1/1994 |
| JP | A 2003-169457 | 6/2003 |

* cited by examiner

*Primary Examiner*—Thanh Lam
(74) *Attorney, Agent, or Firm*—Oliff & Berridge PLC (57) ABSTRACT

A rectifier for an automotive alternator includes a heat sink that has a plurality of rectifying elements mounted thereto to dissipate heat generated by operation of the rectifying elements. The heat sink is configured to be connected with an electrical terminal through an engagement between a male threaded member, which has a male threaded portion and a head portion, and a female threaded member. The heat sink has a recessed portion to accommodate one of the head portion of the male threaded member and the female threaded member. The recessed portion is so shaped to keep the one of the head portion of the male threaded member and the female threaded member from rotating. The heat sink also has a through-bore that communicates with the recessed portion so as to allow the male threaded portion of the male threaded member to extend therethrough to engage with the female threaded member.

12 Claims, 6 Drawing Sheets

STRUCTURE OF RECTIFIER FOR AUTOMOTIVE ALTERNATOR ENSURING RELIABLE ELECTRICAL CONNECTION

CROSS-REFERENCE TO RELATED APPLICATION

This application is based on and claims priority from Japanese Patent Application No. 2004-381760, filed on Dec. 28, 2004, the content of which is hereby incorporated by reference into this application.

BACKGROUND OF THE INVENTION

1. Technical Field of the Invention

The present invention relates generally to electric generators and chagrining systems for vehicles. More particularly, the invention relates to an improved structure of a rectifier for an automotive alternator, which ensures reliable electrical connection of the rectifier with other devices.

2. Description of the Related Art

Conventional rectifiers for automotive alternators generally include a plurality of positive-side rectifying elements (for example, positive-side diodes), a positive-side heat sink, a plurality of negative-side rectifying elements (for example, negative-side diodes), a negative-side heat sink, and a terminal block.

The positive-side rectifying elements are so mounted to the positive-side heat sink that heat generated by operation of the positive-side rectifying elements is dissipated through the positive-side heat sink.

Similarly, the negative-side rectifying elements are so mounted to the negative-side heat sink that heat generated by operation of the negative-side rectifying elements is dissipated through the negative-side heat sink.

The terminal block retains therein electrical conductors that are connected to the positive-side and negative-side rectifying elements. The positive-side and negative-side rectifying elements and the electrical conductors together form a rectification circuit, by which an AC output from a three-phase stator winding of the automotive alternator is rectified.

Figure 7A:
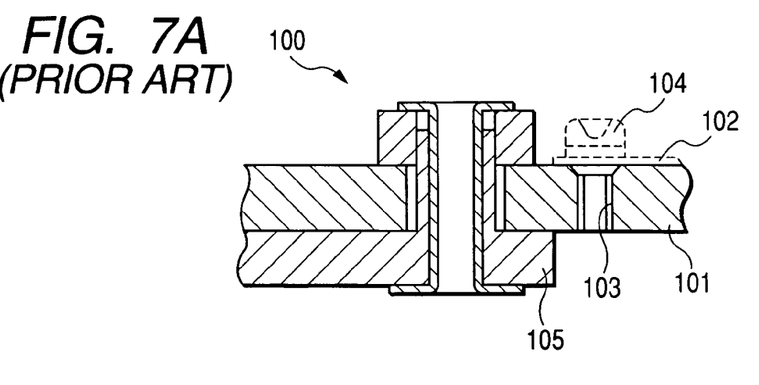
FIG. 7A is a cross-sectional view showing part of a conventional rectifier.
Figure 7B:
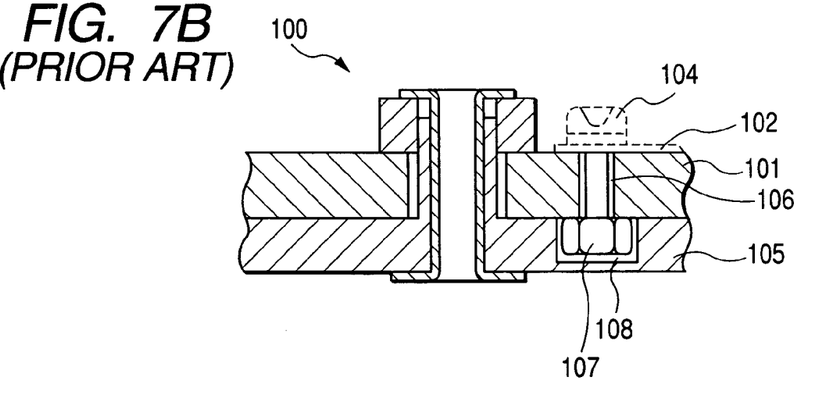
FIG. 7B is a cross-sectional view showing part of another conventional rectifier.

In such a conventional rectifier 100, as shown in FIGS. 7A-7B, at least one of the positive-side and negative-side heat sinks 101 is connected with a terminal 102 of another electrical device (for example, a voltage regulator of the automotive alternator) through an engagement between a male threaded member and a female threaded member.

Figure 8:
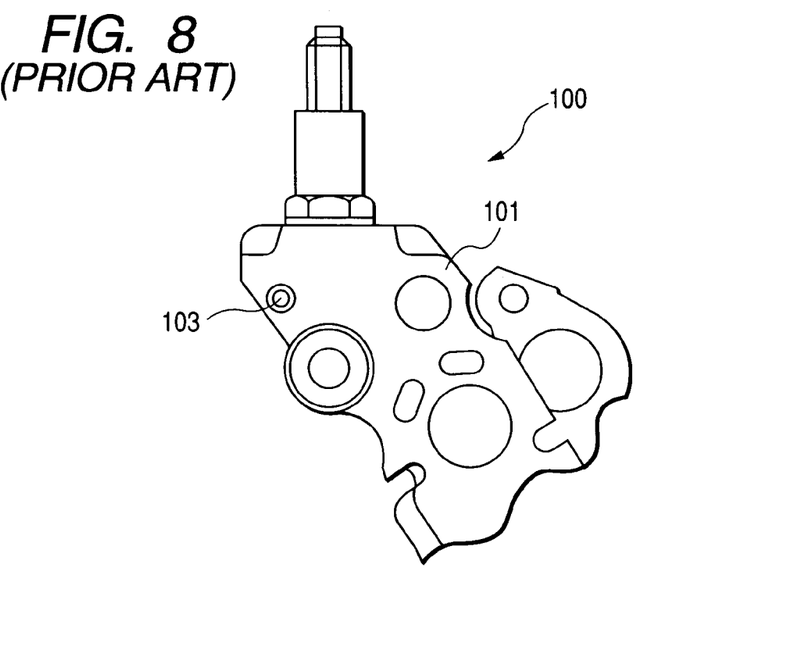
FIG. 8 is an end view showing the part of the conventional rectifier of FIG. 6A.

Specifically, according to a first conventional approach, the heat sink 101 may be configured to have, as shown in FIG. 7A and FIG. 8, a female threaded bore 103 formed therein, which engages with a male threaded member 104, thereby connecting the terminal 102 with the heat sink 101.

However, with such a configuration, as the temperature of the heat sink 101 increases due to heat generated by operation of the rectifying elements mounted thereto, the engagement between the female threaded bore 103 of the heat sink 101 and the male threaded member 104 will become loose. As a result, the male threaded member 104 can be detached from the female threaded bore 103 of the heat sink 101, thus disconnecting the terminal 102 from the heat sink 101.

It should be noted that electrical load of automotive alternators has significantly increased in recent years, and thus the male threaded member 104 has become easier to be detached from the female threaded bore 103 of the heat sink 101 with the above configuration.

As an alternative, according to a second conventional approach, the heat sink 101 may be configured to have, as shown in FIG. 7B, a through-bore 106 that is not threaded and permits a threaded portion of the male threaded member 104 to extend therethrough to engage with a female threaded member (i.e., a nut in FIG. 7B) 107. At the same time, the terminal block 105 may be configured to have a recessed portion 108 and extend to allow the female threaded member 107 to be accommodated in the recessed portion 108. Further, the recessed portion 108 of the terminal block 105 may be so shaped to keep the female threaded member 107 from rotating therein.

With such a configuration, it is possible to connect the terminal 102 with the heat sink 101 through the engagement between the male threaded member 104 and the female threaded member 107 while preventing the engagement from becoming loose due to heat generated by operation of the rectifying elements mounted to the heat sink 101. Moreover, it is also possible to securely retain the female threaded member 107 within the recessed portion 108 of the terminal block 105.

However, with the above configuration, the female threaded member 107 will receive a large torque when the male threaded member 104 is brought into engagement with the female threaded member 107 for connecting the terminal 102 to the heat sink 101 after assembly of the heat sink 101 with the terminal block 105. This torque will then be transmitted to the inner wall of the recessed portion 108 of the terminal block 105, which is generally made of a resin material, thus causing the terminal block 105 to be damaged.

In addition, Japanese Patent First Publication No. 2003-169457 discloses a rectifier for an automotive alternator, in which a metallic fixing bracket (or fitting) having a female threaded portion is provided in a resinous terminal block. The female threaded portion of the fixing bracket engages with a male threaded member to securely connect a heat sink to the terminal block, so as to reduce vibration of the heat sink that occurs during operation of the automotive alternator.

However, in the above rectifier, the fixing bracket will receive a large torque when the male threaded member is brought into engagement with the female threaded portion of the fixing bracket. Consequently, as in the case of FIG. 7B according to the second conventional approach, this torque will cause the resinous terminal block to be damaged.

SUMMARY OF THE INVENTION

It is, therefore, an object of the present invention to solve the above-mentioned problems accompanying conventional rectifiers for automotive alternators.

It is another object of the present invention to provide a rectifier for an automotive alternator which has an improved structure that ensures reliable electrical connection of the rectifier with other devices while preventing a resinous terminal block of the rectifier from being damaged.

It is a further object of the present invention to provide an automotive alternator which includes a rectifier with such an improved structure.

According to one aspect of the present invention, a rectifier for an automotive alternator is provided which includes a plurality of rectifying elements and a heat sink.

The rectifying elements are configured to rectify an AC output from an automotive alternator.

The heat sink has the rectifying elements mounted thereto so as to dissipate heat generated by operation of the rectifying elements. The heat sink is configured to be connected with an electrical terminal through an engagement between a male threaded member, which has a male threaded portion and a head portion, and a female threaded member. The heat sink has a recessed portion to accommodate therein one of the head portion of the male threaded member and the female threaded member. The recessed portion is so shaped to keep the one of the head portion of the male threaded member and the female threaded member from rotating therein. The heat sink also has a through-bore that communicates with the recessed portion so as to allow the male threaded portion of the male threaded member to extend through the through-bore to engage with the female threaded member.

In the preferred mode of the present invention, the recessed portion of the heat sink has an opening at a first surface of the heat sink and a bottom face spaced a given distance from the first surface, and the through-bore of the heat sink extends from the bottom face of the recessed portion to a second surface of the heat sink that is opposite to the first surface.

The rectifier further includes a terminal block that retains therein electrical conductors connected to the rectifying elements. The terminal block extends over the first surface of the heat sink so as to cover the opening of the recessed portion of the heat sink with the one of the head portion of the male threaded member and the female threaded member accommodated in the recessed portion.

In the above rectifier, the rectifying elements may be negative-side rectifying elements and the heat sink may accordingly be a negative-side heat sink.

Otherwise, the rectifying elements may be positive-side rectifying elements and the heat sink may accordingly be a positive-side heat sink. Furthermore, the rectifier may further include a plurality of negative-side rectifying elements and a negative-side heat sink that has the same structure as the positive-side heat sink.

According to another aspect of the present invention, an automotive alternator is provided which includes a rotor, a stator, and a rectifier.

The rotor includes a field winding.

The stator includes a stator winding.

The rectifier includes a plurality of rectifying elements and a heat sink. The rectifying elements are configured to rectify an AC output from the stator winding of the stator. The heat sink has the rectifying elements mounted thereto so as to dissipate heat generated by operation of the rectifying elements. The heat sink is connected with an electrical terminal through an engagement between a male threaded member, which has a male threaded portion and a head portion, and a female threaded member. The heat sink has a recessed portion in which one of the head portion of the male threaded member and the female threaded member is accommodated. The recessed portion is so shaped to keep the one of the head portion of the male threaded member and the female threaded member from rotating therein. The heat sink also has a through-bore communicating with the recessed portion, through which the male threaded portion of the male threaded member extends to engage with the female threaded member.

In the preferred mode of the present invention, the recessed portion of the heat sink of the rectifier has an opening at a first surface of the heat sink and a bottom face spaced a given distance from the first surface, and the through-bore of the heat sink extends from the bottom face of the recessed portion to a second surface of the heat sink that is opposite to the first surface.

The rectifier further includes a terminal block that retains therein electrical conductors connected to the rectifying elements. The terminal block extends over the first surface of the heat sink so as to cover the opening of the recessed portion of the heat sink with the one of the head portion of the male threaded member and the female threaded member accommodated in the recessed portion.

In the above automotive alternator, the rectifying elements of the rectifier may be negative-side rectifying elements and the heat sink of the rectifier may accordingly be a negative-side heat sink.

Otherwise, the rectifying elements of the rectifier may be positive-side rectifying elements and the heat sink of the rectifier may accordingly be a positive-side heat sink. Furthermore, the rectifier may further include a plurality of negative-side rectifying elements and a negative-side heat sink that has the same structure as the positive-side heat sink.

Consequently, through providing the above rectifier and automotive alternator, the objects of the present invention are achieved.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1-5.

It should be noted that, for the sake of clarity and understanding, identical components having identical functions have been marked, where possible, with the same reference numerals in each of the figures.

Figure 1:
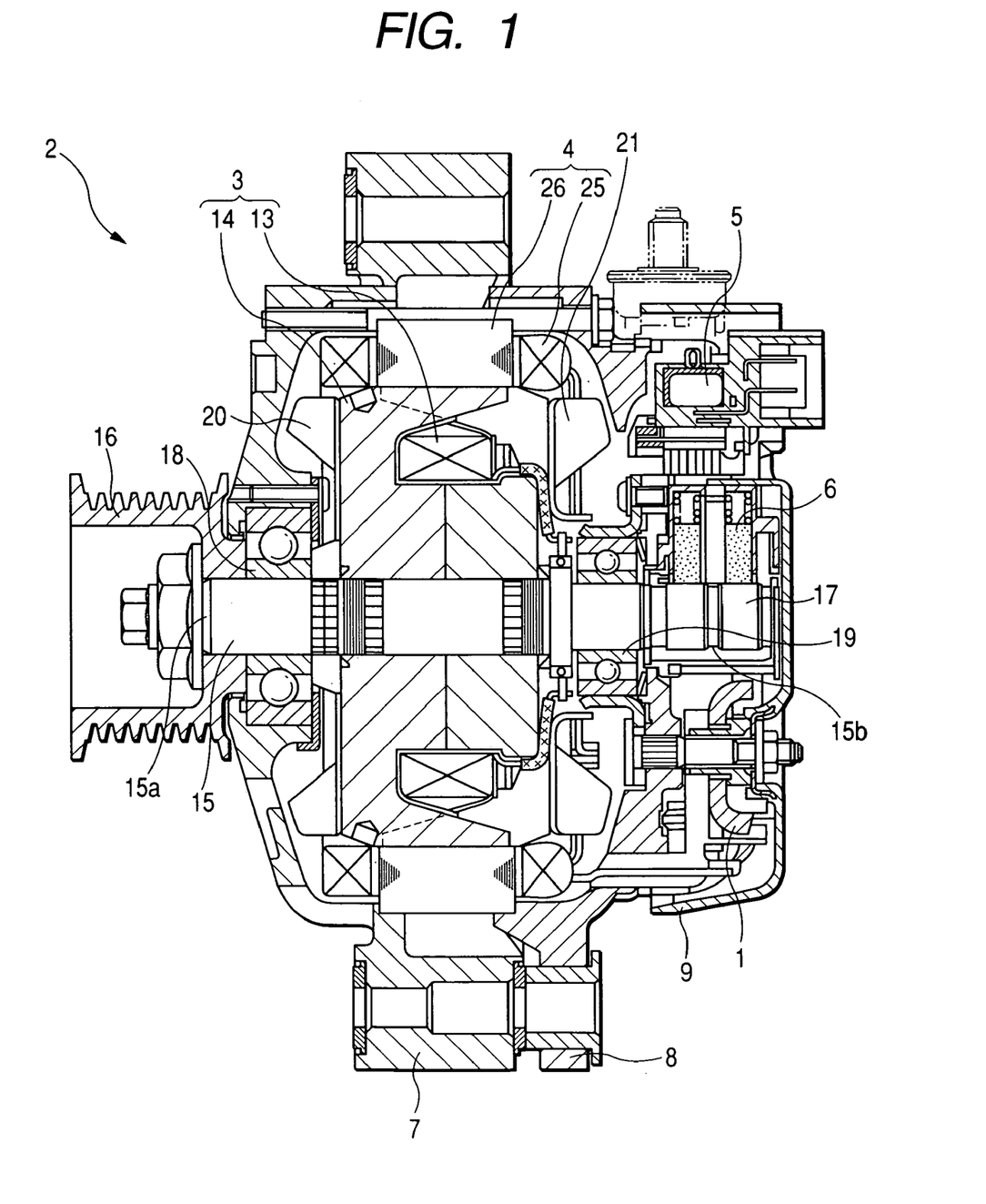
FIG. 1 is a partially cross-sectional view showing the overall configuration of an automotive alternator that includes a rectifier according to an embodiment of the invention.

In this embodiment, a rectifier 1 is provided which is for use in an automotive alternator 2. FIG. 1 shows the overall configuration of the automotive alternator 2 with the rectifier 1 installed therein.

As shown in FIG. 1, the automotive alternator 2 includes, in addition to the rectifier 1, a rotor 3, a stator 4, a voltage regulator 5, brushes 6, a front frame 7, a rear frame 8, and a protective cover 9.

The rotor 3 includes a field winding 13 and a pole core 14. The field winding 13 is so wound around the pole core 14 that the pore core 14 forms magnetic poles when a field current (or exciting current) is supplied to the field winding 13. The rotor 3 is mounted on a rotary shaft 15, which is configured to be turned by a driving force transmitted from an automotive engine via a pulley 16 that is mounted on a first end portion 15a of the rotary shaft 15.

In addition, on opposite end faces of the pole core 14, there are mounted cooling fans 20 and 21, respectively. The cooling fans 20 and 21 work to create a cooling air flow with rotation of the rotor 3.

The stator 4 surrounds the rotor 3 and includes a three-phase stator winding 25 and a stator core 26. The stator winding 25 is so wound around the stator core 26 that a rotating magnetic flux created by the rotor 3 passes through the stator core 26, thus inducing a three-phase AC voltage across the stator winding 25.

The rectifier 1 is configured to full-wave rectify the three-phase AC voltage outputted from the three-phase stator winding 25.

The voltage regulator 5 is configured to regulate a DC voltage outputted from the rectifier 1 through controlling the field current supply to the filed winding 13.

The brushes 6 are in sliding contacts with slip rings 17 mounted on a second end portion 15b of the rotary shaft 15, so that the filed current can be supplied from the brushes 6 to the field winding 13 via the slip rings 17.

The front frame 7 and the rear frame 8 are joined together to accommodate therein the rotor 3, stator 4, and cooling fans 20 and 21. Moreover, the front and rear frames 7 and 8 retain therein bearings 18 and 19, respectively. The bearings 18 and 19 together work to rotatably support the rotary shaft 15.

The protective cover 9 covers the rectifier 1, the voltage regulator 5, and the brushes 6, all of which are mounted to an end wall of the rear frame 8 from outside, so as to protect them from foreign matters.

Having described the overall configuration of the automotive alternator 2, details of the rectifier 1 will be described hereinafter.

Figure 2:
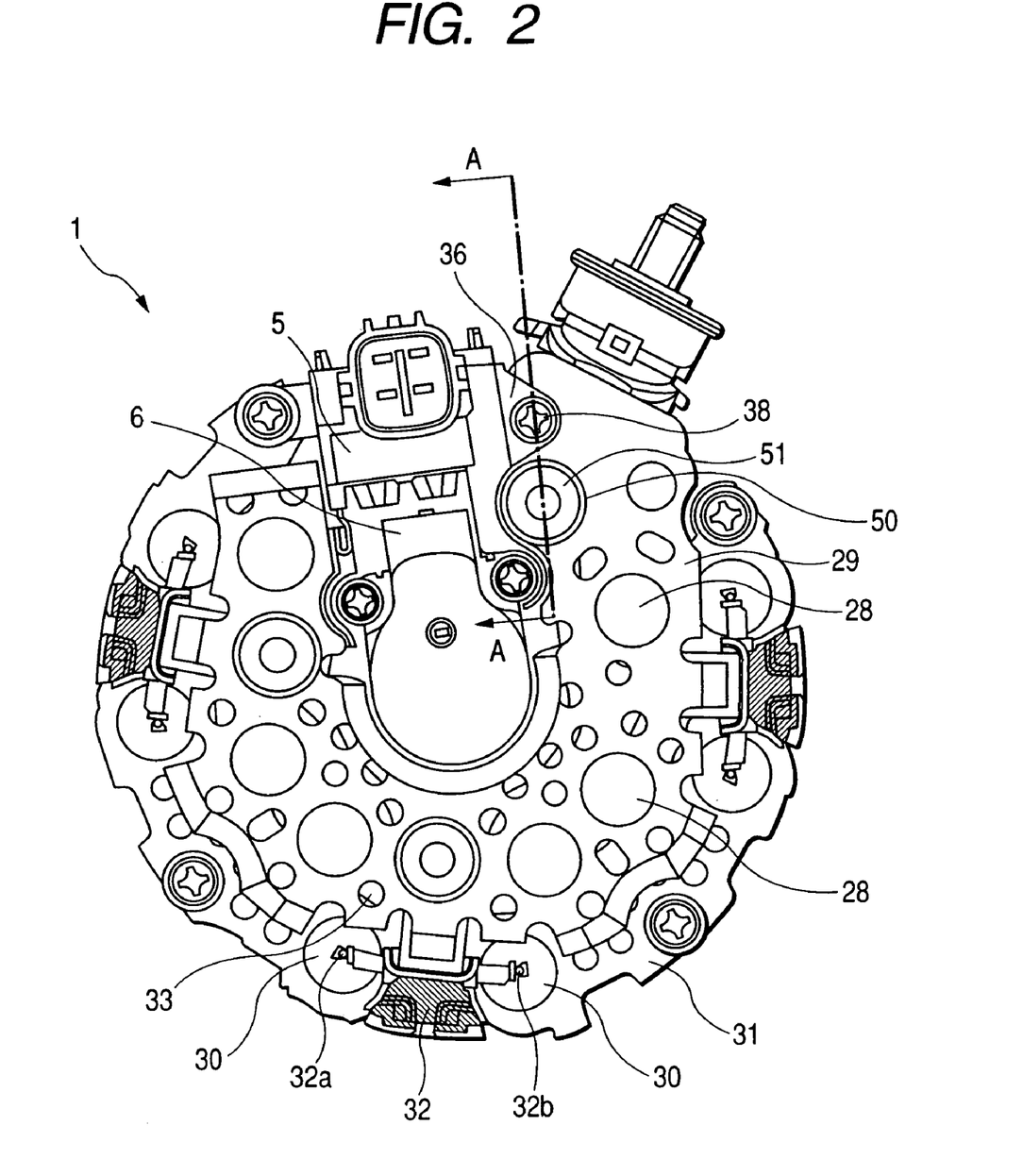
FIG. 2 is an end view showing the overall configuration of the rectifier according to the embodiment of the invention.

With reference to FIG. 2, the rectifier 1 includes a plurality of positive-side diodes 28, a positive-side heat sink 29, a plurality of negative-side diodes 30, a negative-side heat sink 31, and a terminal block 32.

The positive-side diodes 28 and negative-side diodes 30 are employed as rectifying elements to full-wave rectify the three-phase AC voltage outputted from the three-phase stator winding 25.

Figure 3:
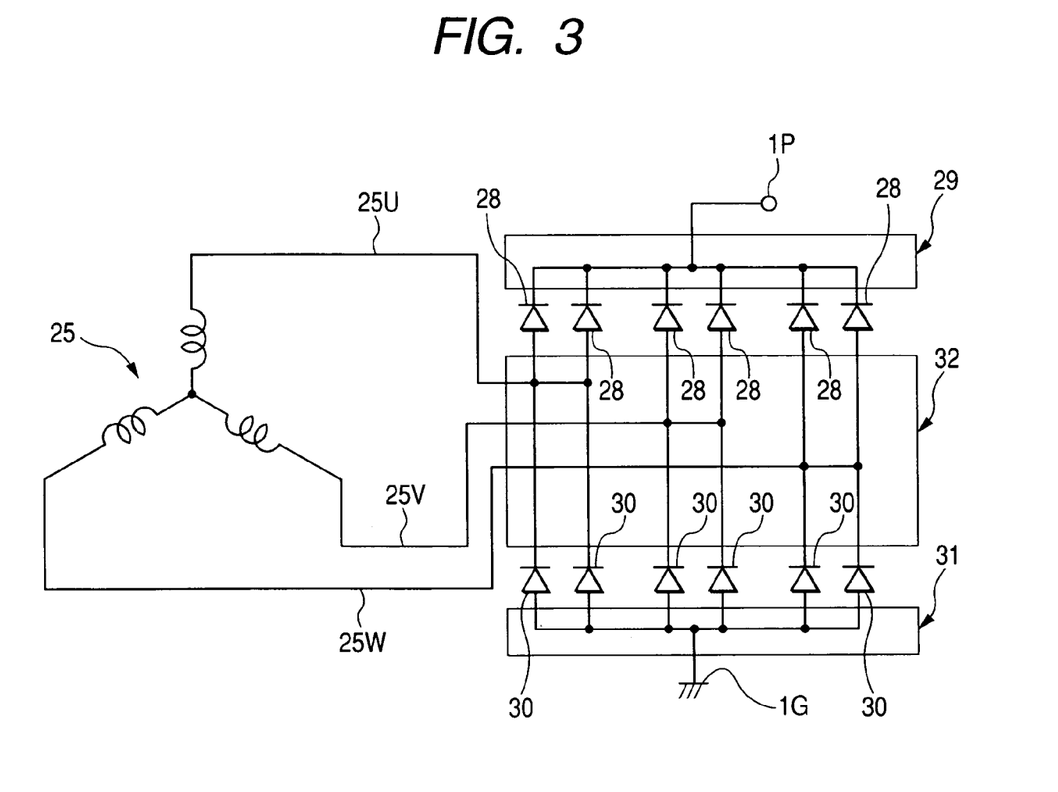
FIG. 3 is a circuit diagram showing a rectification circuit of the rectifier of FIG. 2.

FIG. 3 shows a rectification circuit of the rectifier 1. In the figure, there are provided a pair of positive-side diodes 28 and a pair of negative-side diodes 30 for each of the three phase terminals 25U, 25V, and 25W of the three-phase stator winding 25.

It should be noted that other numbers of the positive-side and negative-side diodes 28 and 30 may also be used to form a rectification circuit different from that of FIG. 3.

The positive-side heat sink 29 is made, for example, of aluminum (Al) or its alloy. The positive-side diodes 28 are mounted to the positive-side heat sink 29 by, for example, press-fitting, so that heat generated by operation of the positive-side diodes 28 can be dissipated through the positive-side heat sink 29. Moreover, as shown in FIG. 3, the positive-side heat sink 29 electrically connects all the cathodes of the positive-side diodes 28 together, defining a positive terminal 1P of the rectifier 1.

Similarly, the negative-side heat sink 31 is also made, for example, of aluminum or its alloy. The negative-side diodes 30 are mounted to the negative-side heat sink 31 by, for example, press-fitting, so that heat generated by operation of the negative-side diodes 30 can be dissipated through the negative-side heat sink 31. Moreover, as shown in FIG. 3, the negative-side heat sink 31 electrically connects all the anodes of the negative-side diodes 30 together, defining a ground terminal 1G of the rectifier 1.

The terminal block 32 is made of a resin material and has electrical conductors (not shown) insert-molded therein. The electric conductors retained in the terminal block 32 are electrically connected to the positive-side diodes 28 and the negative-side diodes 30, thereby forming the rectification circuit of the rectifier 1. For example, in FIG. 2, there are illustrated leads 32a and 32b extending from the terminal block 32, which are respectively welded or soldered to the cathodes of a pair of negative-side diodes 30.

In addition, as shown in FIG. 2, the positive-side heat sink 29 and the negative-side heat sink 31 each have a plurality of air vents 33 formed therein, so as to more effectively dissipate heat generated by operation of the diodes mounted thereto.

Figure 4:
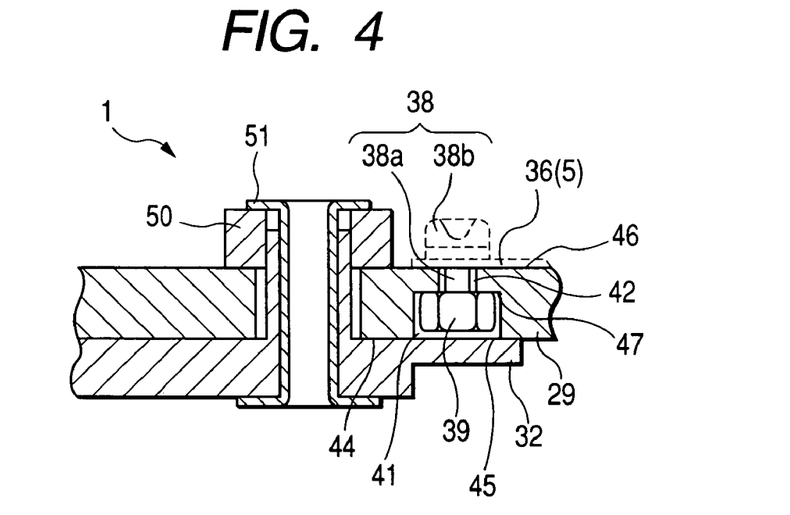
FIG. 4 is a cross sectional view taken along the line A-A in FIG. 2.

Referring now to FIG. 4, in the present embodiment, the positive-side heat sink 29 of the rectifier 1, which represents the positive terminal 1P of the rectifier 1, is connected with a positive terminal 36 of the voltage regulator 5 through an engagement between a male threaded member (i.e., a bolt in FIG. 4) 38 and a female threaded member (i.e., a nut in FIG. 4) 39.

The male threaded member 38 includes a cylindrical male threaded portion 38a and a head portion 38b that has the shape of a hexagonal prism. The female threaded member 39 has the shape of a hollow hexagonal prism with a cylindrical inner wall thereof female threaded.

The positive-side heat sink 29 has a recessed portion 41 to accommodate therein the female threaded member 39 and a through-bore 42 that communicates with the recessed portion 41 so as to allow the male threaded portion 38a of the male threaded member 38 to extend therethrough to engage with female threaded member 39.

Figure 5:
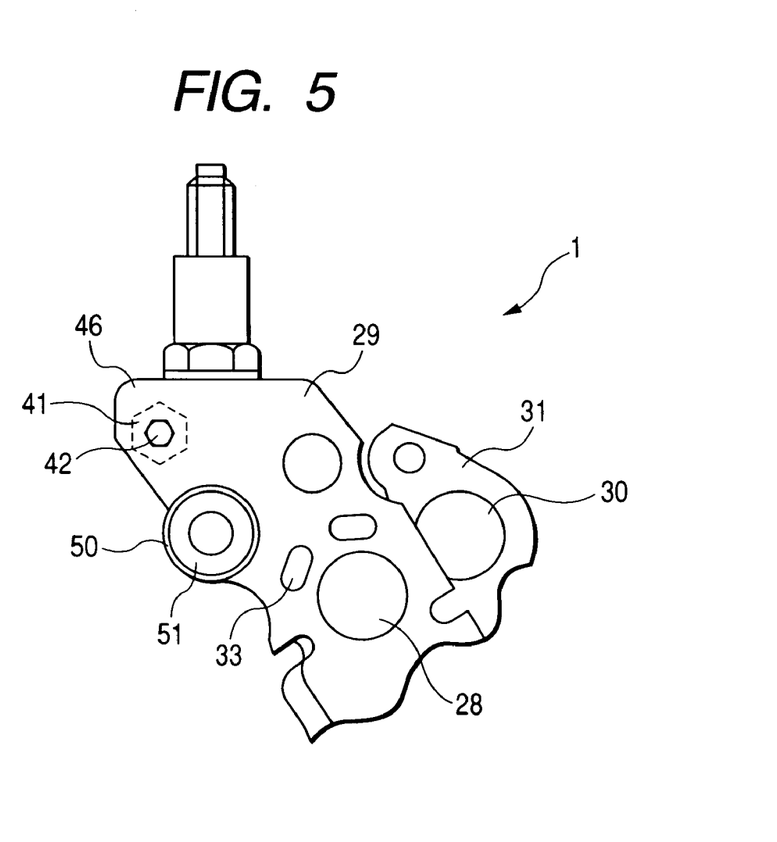
FIG. 5 is an enlarged end view showing part of the rectifier of FIG. 2.

The recessed portion 41 of the positive-side heat sink 29 has, with reference to FIG. 5, a hexagonal cross section corresponding to that of the female threaded member 39, so as to keep the female threaded member 39 from rotating in the recessed portion 41.

Further, the recessed portion 41 of the positive-side heat sink 29 has an opening 45 at a first surface 44 of the positive-side heat sink 29, through which the female threaded member 39 is placed in the recessed portion 41. The recessed portion 41 also has a bottom face 47, which is spaced from the first surface 44 of the positive-side heat sink 29 a given distance that is not less than the axial length of the female threaded member 39. The through-bore 42 extends from the bottom face 47 of the recessed portion 41 to a second surface 46 of the positive-side heat sink 29 that is opposite to the first surface 44.

The terminal block 32 is so formed to extend over the first surface 44 of the positive-side heat sink 29 to cover the opening 45 of the recessed portion 41 of the positive-side heat sink 29. With such a formation, the female threaded member 39 is completely enclosed within the recessed portion 41 of the positive-side heat sink 29.

In addition, during assembly of the rectifier 1, the positive-side heat sink 29, the terminal block 32, and a spacer 50 are joined together by means, for example, of a pipe rivet 51, with the female threaded member 39 accommodated in the recessed portion 41 of the positive-side heat sink 29. The assembled rectifier 1 is then mounted to the end wall of the rear frame 8, and the positive terminal 36 of the voltage regulator 5 is connected to the positive-side heat sink 29 of the rectifier 1 by bringing the male threaded member 38 into engagement with the female threaded member 39.

The above-described rectifier 1 according to the present embodiment has the following advantages.

First, in the rectifier 1, the positive-side heat sink 29 is connected to the positive terminal 36 of the voltage regulator 5 through the engagement between the male threaded member 38 and a female threaded member 39. The positive-side heat sink 29 has a recessed portion 41, which accommodates the female threaded member 39 and keep it from rotating, and a through-bore 42 that communicates with the recessed portion 41 so as to allow the male threaded portion 38a of the male threaded member 38 to extend therethrough to engage with female threaded member 39.

Consequently, compared to the case of providing a female threaded bore directly in the positive-side heat sink 29, much less heat will be transferred to the mutually engaged male and female threaded portions of the male threaded member 38 and the female threaded member 39, thus preventing the engagement from becoming loose due to heat generated by operation of the positive-side diodes 28. As a result, the male threaded member 38 is prevented from being detached from the female threaded member 39, thereby ensuring reliable connection of the positive-side heat sink 29 with the positive terminal 36 of the rectifier 5.

Moreover, compared to the case of providing a recessed portion in the terminal block 32, no torque will be applied to the terminal block 32 when the male threaded member 38 is brought into engagement with the female threaded member 39, thus preventing the resinous terminal block 32 from being damaged due to any unnecessary torque applied thereto.

Further, in the rectifier 1 according to the present embodiment, the recessed portion 41 of the positive-side heat sink 29 has the opening 45 at the first surface 44 of the positive-side heat sink 29 and the bottom face 47 spaced the given distance from the first surface 44, and the through-bore 42 extends from the bottom face 47 of the recessed portion 41 to the second surface 46 of the positive-side heat sink 29 that is opposite to the first surface 44.

Consequently, the recessed portion 41 and through-bore 42 of the positive-side heat sink 29 can be concurrently formed by aluminum die casting, thus reducing manufacturing cost of the positive-side heat sink 29.

Furthermore, in the rectifier 1 according to the present embodiment, the terminal block 32 is so formed to extend over the first surface 44 of the positive-side heat sink 29 to cover the opening 45 of the recessed portion 41 of the positive-side heat sink 29.

Consequently, the female threaded member 39 is completely enclosed within the recessed portion 41 of the positive-side heat sink 29, so that it can be securely retained within the recessed portion 41 and protected from foreign matters.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the recessed portion 41 and the through-bore 42 are provided in the positive-side heat sink 29, for connecting the positive terminal 36 of the voltage regulator 5 to the positive-side heat sink 29.

However, such a recessed portion and through-bore may also be provided in the negative-side heat sink 31, for connecting a negative terminal of the voltage regulator 5 to the negative-side heat sink 31 that represents the ground terminal 1G of the rectifier 1.

Moreover, additional such recessed portions and through-bores may also be provided in the positive-side and negative-side heat sinks 29 and 31, for connecting terminals of the brushes 6 to the heat sinks 29 and 31.

Further, in the previous embodiment, the recessed portion 41 of the positive-side heat sink 29 is configured to accommodate the female threaded member 39.

However, the recessed portion 41 of the positive-side heat sink 29 may also be configured to accommodate the head portion 38b of the male threaded member 38 instead of the female threaded member 39.

Furthermore, in the previous embodiment, the automotive alternator 2 is configured to include the single three-phase stator winding 25.

However, the automotive alternator 2 may also be configured to further include another three-phase stator winding 25', in addition to the three-phase stator winding 25.

Figure 6:
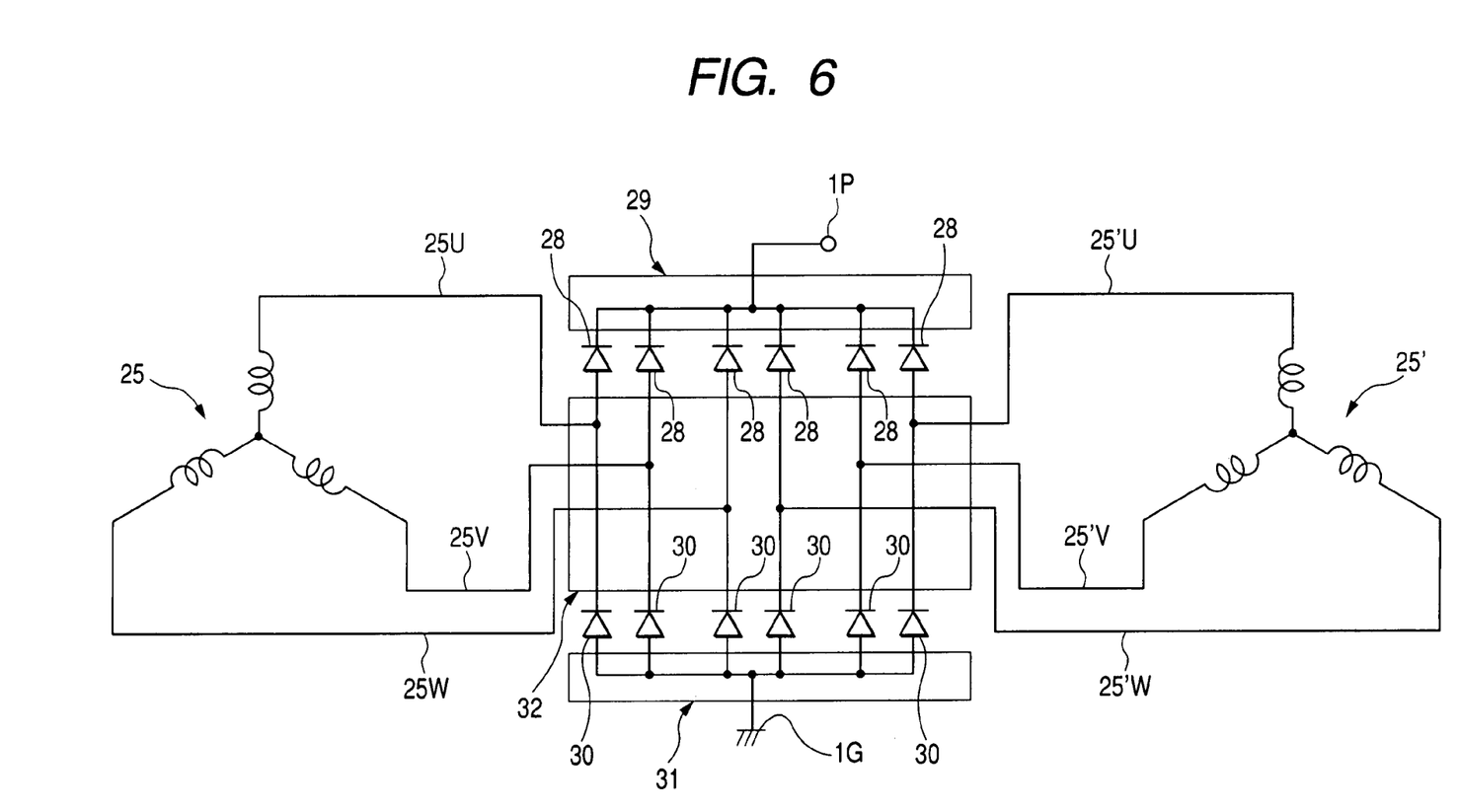
FIG. 6 is a circuit diagram showing a rectification circuit of a variation of the rectifier of FIG. 2.

In this case, the positive-side diodes 28 and negative-side diodes 30 of the rectifier 1 may be rearranged to form a rectification circuit as shown in FIG. 6, so as to full-wave rectify both the three-phase AC voltages outputted from the three-phase stator windings 25 and 25'.

Such modifications, changes, and improvements within the skill of the art are intended to be covered by the appended claims.

What is claimed is:

1. A rectifier for an automotive alternator comprising:
a plurality of rectifying elements configured to rectify an AC output from an automotive alternator; and
a heat sink having said rectifying elements mounted thereto so as to dissipate heat generated by operation of said rectifying elements, said heat sink being configured to be connected with an electrical terminal through an engagement between a male threaded member, which has a male threaded portion and a head portion, and a female threaded member, said heat sink having a recessed portion to accommodate therein one of the head portion of the male threaded member and the female threaded member, the recessed portion being so shaped to keep the one of the head portion of the male threaded member and the female threaded member from rotating therein, said heat sink also having a through-bore that communicates with the recessed portion so as to allow the male threaded portion of the male threaded member to extend through the through-bore to engage with the female threaded member.

2. The rectifier as set forth in claim 1, wherein the recessed portion of the heat sink has an opening at a first surface of the heat sink and a bottom face spaced a given distance from the first surface, and the through-bore of the heat sink extends from the bottom face of the recessed portion to a second surface of the heat sink that is opposite to the first surface.

3. The rectifier as set forth in claim 2 further comprising a terminal block that retains therein electrical conductors connected to the rectifying elements, wherein the terminal block extends over the first surface of the heat sink so as to cover the opening of the recessed portion of the heat sink with the one of the head portion of the male threaded member and the female threaded member accommodated in the recessed portion.

4. The rectifier as set forth in claim 1, wherein the rectifying elements are positive-side rectifying elements and the heat sink is a positive-side heat sink.

5. The rectifier as set forth in claim 4 further comprising a plurality of negative-side rectifying elements and a negative-side heat sink that has the same structure as the positive-side heat sink.

6. The rectifier as set forth in claim 1, wherein the rectifying elements are negative-side rectifying elements and the heat sink is a negative-side heat sink.

7. An automotive alternator comprising:
a rotor including a field winding;
a stator including a stator winding; and
a rectifier including a plurality of rectifying elements and a heat sink, the rectifying elements being configured to rectify an AC output from the stator winding of said stator, the heat sink having said rectifying elements mounted thereto so as to dissipate heat generated by operation of said rectifying elements, said heat sink being connected with an electrical terminal through an engagement between a male threaded member, which has a male threaded portion and a head portion, and a female threaded member, said heat sink having a recessed portion in which one of the head portion of the male threaded member and the female threaded member is accommodated, the recessed portion being so shaped to keep the one of the head portion of the male threaded member and the female threaded member from rotating therein, said heat sink also having a through-bore communicating with the recessed portion, through which the male threaded portion of the male threaded member extends to engage with the female threaded member.

8. The automotive alternator as set forth in claim 7, wherein the recessed portion of the heat sink of said rectifier has an opening at a first surface of the heat sink and a bottom face spaced a given distance from the first surface, and the through-bore of the heat sink extends from the bottom face of the recessed portion to a second surface of the heat sink that is opposite to the first surface.

9. The automotive alternator as set forth in claim 8, wherein said rectifier further includes a terminal block that retains therein electrical conductors connected to the rectifying elements, and wherein the terminal block extends over the first surface of the heat sink so as to cover the opening of the recessed portion of the heat sink with the one of the head portion of the male threaded member and the female threaded member accommodated in the recessed portion.

10. The automotive alternator as set forth in claim 7, wherein the rectifying elements of said rectifier are positive-side rectifying elements and the heat sink of said rectifier is a positive-side heat sink.

11. The automotive alternator as set forth in claim 10, wherein said rectifier further includes a plurality of negative-side rectifying elements and a negative-side heat sink that has the same structure as the positive-side heat sink.

12. The automotive alternator as set forth in claim 7, wherein the rectifying elements of said rectifier are negative-side rectifying elements and the heat sink of said rectifier is a negative-side heat sink.

* * * * *